Figure 1:
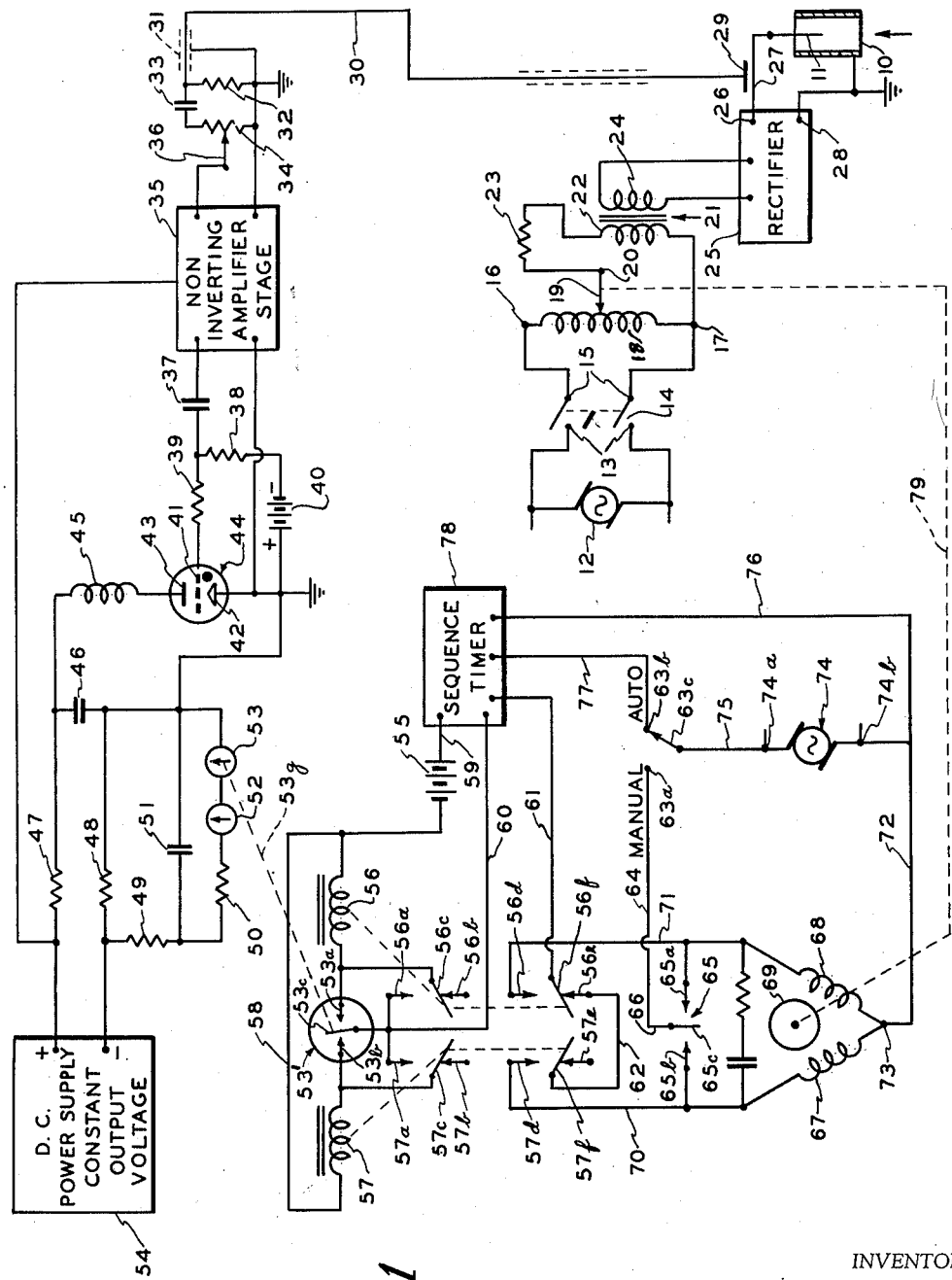

April 13, 1954     H. J. HALL     2,675,092
SYSTEM FOR ENERGIZING ELECTRICAL PRECIPITATORS
Filed May 15, 1952     2 Sheets-Sheet 1

INVENTOR
HERBERT J. HALL
BY Harold T. Stowell
ATTORNEY

INVENTOR
HERBERT J. HALL

BY Harold T. Stowell
ATTORNEY

Patented Apr. 13, 1954

2,675,092

UNITED STATES PATENT OFFICE 2,675,092

SYSTEM FOR ENERGIZING ELECTRICAL PRECIPITATORS

Herbert J. Hall, Hopewell Township, Mercer County, N. J., assignor to Research Corporation, New York, N. Y., a corporation of New York Application May 15, 1952, Serial No. 287,985

4 Claims. (Cl. 183—7)

This invention relates to an improved system for automatically controlling the operating voltage of electrical precipitators and the like in accordance with the rate of sparking between the electrodes of a precipitator.

In the operation of electrical precipitators of the Cottrell type, the collection efficiency increases as the voltage between electrodes is raised. At a certain voltage level for a given construction of precipitator, sparking appears between the electrodes, the rate of sparking being a function of the voltage level. It has been found as the sparking rate increases, a point is reached at which the efficiency begins to decrease, that is to say, there is a particular sparking rate for maximum efficiency. This optimum rate may vary for different operating conditions and for different precipitators, but the range from ten to 1000 sparks per minute will cover all differences normally encountered.

An object of the invention is to provide a system for energizing the electrodes of electrical precipitators that automatically sets and holds the voltage at a value corresponding to substantially optimum sparking rate.

A system of the above type is disclosed in my U. S. patent application for "System for Energizing Electrical Precipitators" filed June 19, 1950, Serial No. 169,019, now Patent 2,623,608 dated December 30, 1952. The present invention is an improvement over the above-described system, and has for its primary object the provision of a simple, reliable and inexpensive electronic integrating system for measuring the average rate of occurrence of a series of events and for providing control in accordance with the result of this measurement. Another object is to continuously indicate this average rate on a meter.

Another object is to provide an electronic current integrator and system for measuring and controlling the average rate of occurrence of a series of events wherein the response of the system to a change in rate of occurrence is an exponential function of time, whereby the effectiveness of control is increased as the deviation from a desired rate is increased.

Still another object is to provide an electronic current-integrating system whereby the integrating time-constant can be easily adjusted to suit conditions as desired.

A further object is to provide an electronic current-integrating system which can be used with simple auxiliary circuits and a contact-making current meter for controlling the voltage on an electrostatic precipitator in accordance with the integrated average sparking rate of the precipitator.

It is an advantage of the improved system that measurement of the precipitator average sparking rate is substantially continuous rather than periodic (as in the above-identified prior application), whereby changes in the sparking rate can be followed more closely.

Another advantage resides in the elimination of many complicated mechanical elements, and their replacement by electronic circuit elements which are not subject to wear and do not require frequent adjustment or critical manufacturing tolerances.

In situations where frequent or rapid changes in precipitator load occur, as in the cleaning of sintering furnace or cupola furnace gases, continuous voltage control may be desirable. This is readily provided by the improved system.

Figure 2:
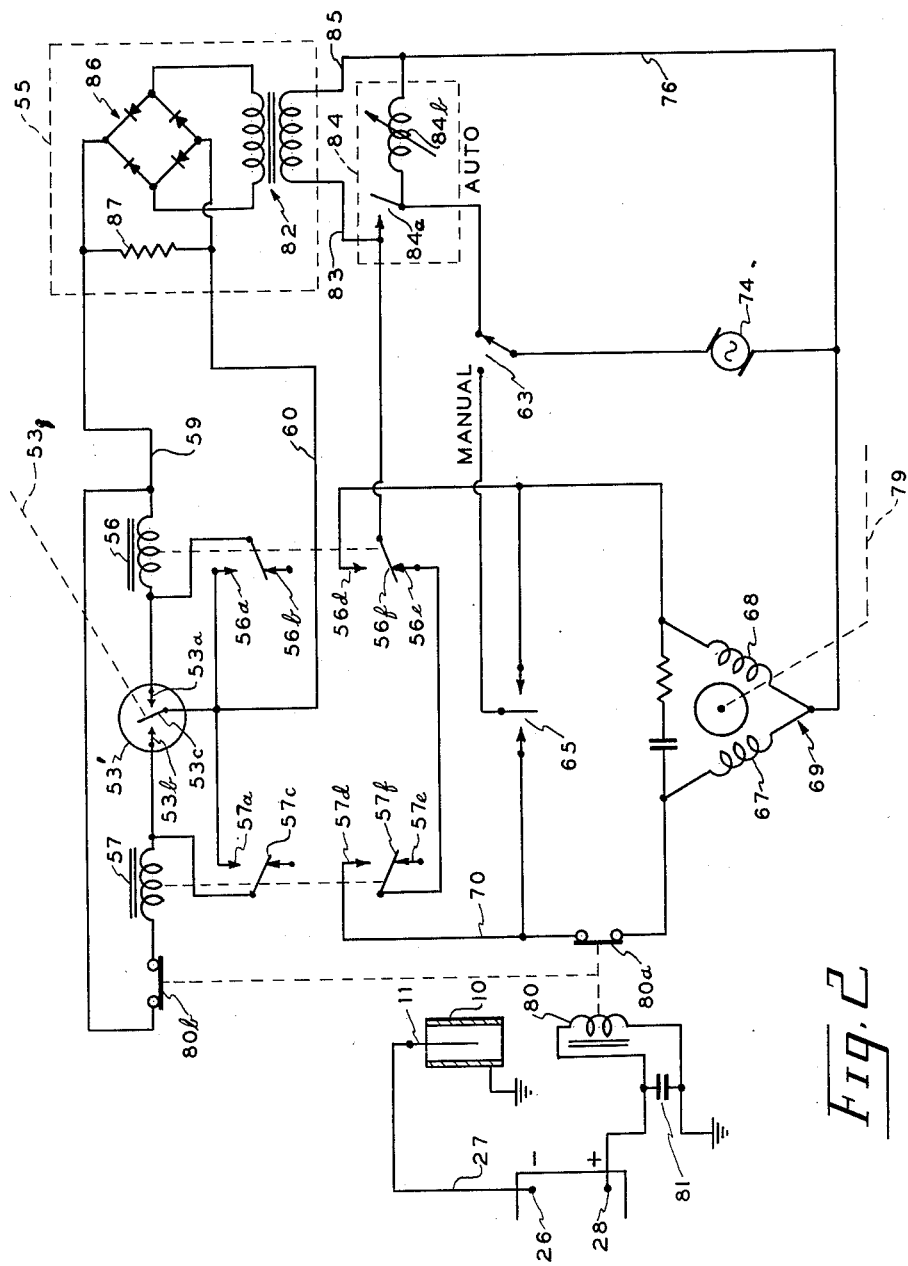

Other objects and advantages will be apparent from the following description and drawings, in which Fig. 1 is a schematic diagram and circuit drawing of a system in accordance with the invention; and Fig. 2 is a similar schematic diagram of an alternative preferred modification of the circuit of Fig. 1.

Referring to Fig. 1, the electrical precipitator indicated includes an extended surface collecting electrode 10, which may be in the form of a vertically disposed, grounded, metallic tube, and a fine wire discharge electrode 11 depending axially into the tube. These components are conventional and illustrative only. When the discharge electrode 11 is supplied with high tension current of the order of 60,000 volts, corona discharge occurs. Gas bearing suspended particles of material is passed through the tube 10 wherein the suspended particles are charged and deposited principally on the inner surface of the tube 10 from which the collected material is removed from time to time. In this well known manner, the gas is relieved of its suspended material.

Current for energizing the electrodes of the precipitator may be supplied by a source of alternating current 12 to the input terminals 13 of a switch 14. The output terminals 15 of the switch are connected to the end terminals 16 and 17 of an adjustable auto-transformer 18 having a control arm 19, adjustment of which varies the output voltage appearing across the terminals 17 and 20 of the auto-transformer.

A power transformer 21 has its primary winding 22 connected to the output terminals of the auto-transformer, through a surge-damping resistor 23. The secondary winding 24 of the power transformer supplies high voltage alternating current to a rectifier 25 that may be of any usual type such as a mechanical rotary switch rectifier or an electron tube rectifier.

One rectifier output terminal 26, preferably the negative terminal, is connected through a cable 27 to the discharge electrode 11 of the precipitator. The other output terminal 28 is grounded and thus is indirectly connected to the extended surface electrode 10 of the precipitator.

The energizing system, as thus far described, is merely illustrative, and other similar energizing apparatus having means for adjusting the voltage applied to the precipitator electrodes may be employed instead. In a characteristic embodiment, the current source 12 supplies 60 C. P. S. current at 440 volts which is stepped up by the power transformer 21 to about 60,000 volts.

Inter-electrode sparking in the precipitator is sensed or detected by capacitor plate 29 adjacent to high voltage cable pothead on cable 27 carrying current to the precipitator. With the usual negative polarity on precipitator discharge electrode 11, a precipitator spark produces, therefore, a positive transient voltage pulse across the capacitance divider consisting of pick-up plate or device 29 and the capacity to ground between cable conductor 30 and concentric shield 31. Said voltage pulse is fed to a non-inverting amplifier stage 35 (for negative precipitator H. T.) through coupling network consisting of resistor 32, capacitance 33, and potentiometer 34. Potentiometer 34 has an adjustable arm 36 for varying the amplitude of the voltage pulse entering the amplifier to a suitable value. The amplifier may be conventional, for example, a two-stage resistance-capacitance coupled amplifier using a dual triode such as a 6SN7.

The output of the amplifier is fed through coupling condenser 37 and current-limiting resistor 39 to the control grid 41 of a thyratron tube 44. The thyratron is gas filled for example, xenon which renders operation insensitive to ambient temperature over a wide range. Tube 44 has a heated cathode 42 and anode 43 across which, connected in series, are inductance 45 and condenser 46.

A source of D. C. voltage and current 54, having its positive terminal connected through resistor 47 to the side of condenser 46 connected to inductance 45 and its negative terminal connected via the network consisting of resistors 48, 49, 50, condenser 51, and current meters 52 and 53 to the other side of condenser 46, thyratron cathode 42, and ground, is used to charge condenser 46. The D. C. source 54 has a regulated output voltage which is maintained constant within a few percent or less. It may consist of a conventional regulated D. C. power supply with power transformer, rectifier, filter, and an electronic or gas tube voltage regulator. Alternatively, a constant-voltage - type alternating - current transformer available commercially in standard sizes, together with an electronic tube rectifier and smoothing filter with a bleeder resistor is quite satisfactory.

When the power supply is turned on, condenser 46 becomes charged to a suitable D. C. voltage. This voltage also appears across inductance 45 and thyratron 44 which is normally held in a non-conducting state by a negative D. C. bias voltage indicated as 40, which is connected through isolating resistance 38 and resistance 39 to the grid 41. When the precipitator sparks, the transient voltage pulse, detected as described by pick-up 29, is amplified to provide a positive pulse of sufficient amplitude to overcome bias voltage 40 and thereby cause thyratron 44 to conduct and condenser 46 to discharge through inductance 45 and thyratron 44. After the discharge the thyratron quickly becomes non-conducting again and condenser 46 is recharged from D. C. source 54. Inductance 45 is used to limit the peak discharge current through the thyratron to a value consistent with the tube ratings and also to cause the voltage across 46 to reverse polarity by the end of the discharge to assist in rapidly deionizing the thyratron so that it quickly becomes non-conducting and remains so by means of bias 40 until another precipitator spark repeats the process. Thus for each spark in the precipitator, a certain fixed electric charge is transferred from current source 54 to condenser 46. This charge multiplied by the average number of sparks occurring in a second is the average condenser charging current which is indicated by meters 52 and 53. The network 48, 49, 50, 51, 52, 53, constitutes an R.-C. integrating circuit which smooths out the individual current pulses charging condenser 46 so that a steady indication on meters 52 and 53 is obtained. 52 and 53 are microammeters, so that only a small portion of the total current is required—thereby permitting resistors 49 and 50 to be large compared to 48 and a long integrating time of several minutes thus obtained with a reasonable size capacitor 51. For convenience, meters 52 and 53 can be calibrated directly in average sparks per minute. Meter 52 is merely used as a continuous indicator of average sparking rate. Its use is of course optional for automatic precipitator voltage control, since meter 53, which is a contact-making microammeter, can be used for this purpose at any given time by separating momentarily the contact pointers sufficiently to allow a reading to be taken.

For controlling precipitator voltage the variable auto-transformer arm 19 is operated through conventional driving mechanisms indicated at 79 by a reversible motor 69 having two windings 67 and 68 connected as shown. A source of alternating current 74, having terminal 74b connected by wire 72 to the common junction 73 of windings 67 and 68 and terminal 74a connected by wire 75 to control switch 63, supplies power for energizing motor 69 either on manual or automatic control.

On manual control, switch 63 is turned so that arm 63c connects wire 75 to point 63a; thus one side of the power source 74 is connected via wire 64 to control switch 65 at point 66. 65 is a lever-type switch normally in position shown. It has an insulated handle on arm 65c so that the latter may be moved so as to connect point 66 either to contact 65a or contact 65b. In the former case it is clear that winding 68 will be energized; this moves arm 19 in the direction to lower precipitator voltage; in the latter case, winding 67 will be energized, which reverses the motor direction and moves arm 19 in the direction to raise the precipitator voltage.

On automatic control, precipitator voltage is regulated so as to maintain the average sparking rate within the desired limits set by the two adjustable contacts 53a and 53b on contact-making switch 53'. The meter pointer 53c is equipped with contacts so that if the sparking rate is too low the circuit between wire 60 and contact 53b is closed; if the sparking rate is too high, the circuit between wire 60 and contact 53a is closed. 56 and 57 are auxiliary relays each having double-pole, double-throw contacts indicated by respective letter subscripts. Battery 55 supplies energy for these relays via wire 59, sequence timer 78, wire 60, contacts 53a, b, c, on one side and the common connection 58 on the other side. Alternating current for operating the motor of sequence timer 78 is obtained from source 74 through wire 76 and wire 75 via selector switch 63 and wire 77. Wires 70 and 71 connect contacts 57d and 56d respectively to motor windings 67 and 68.

The operation of the automatic control system is as follows: assume the sparking rate is too low; then contacts 53c and 53b will be closed by rotation of shaft 53g connecting meter 53 and 53'. Having set switch 63 in "Auto" position as shown, the sequence timer motor will be energized and at the appropriate time in its cycle, the circuit between wires 59 and 60 will close, thus energizing relay 57. This closes holding contacts 57c and 57a and also contacts 57d and 57f. Shortly thereafter, the sequence timer closes the circuit between wires 77 and 61 which places power source 74, via wire 72 on one side and via wire 61, contacts 56e and 56f, wire 62 contacts 57f and 57d, and wire 70 on the other side, across winding 67 of motor 69 which raises the precipitator voltage as already described. The precipitator voltage is increased a suitable amount which is controlled by the length of time the sequence timer is adjusted to hold the circuit between wires 61 and 77 closed. At the end of the adjustment interval, this circuit is opened and shortly thereafter the circuit 59—60 is also opened de-energizing relay 57. At some later time, the situation will again be sampled and an appropriate correction to precipitator voltage is made according to the position of contact-making meter pointer 53c. If the rate is too high the voltage is lowered an increment by means of relay 56 in a similar manner to that just described for raising the voltage. As long as the meter pointer indicates a sparking rate between the desired limits set, no voltage adjustment is made. The frequency of adjustment is controlled by the cycle time of sequence timer 78 which can be adjusted to suit the conditions, for example, every 5 minutes, every 30 minutes, etc. It will be obvious from the circuit diagram that relay 56 and 57 contacts are so arranged that power cannot be supplied simultaneously to both windings 67 and 68.

It will thus be seen that adjustment of precipitator voltage is in fixed increments on a cycled or periodic basis. On the other hand, since the new electronic integrator provides a continuous measure of the average sparking rate integrated over a period of time which for electrical precipitation work may be a few minutes, one can take advantage of this feature by using essentially a continuous voltage control system whereby the variable autotransformer 18 is operated on an inching basis as illustrated in the Fig. 2. In this circuit the sequence timer is replaced by a simple percentage timer 84 whose on-off switch 84a is operated by motor 84b so that the switch 84a closes for an adjustable percentage of time—for example 1 or 2 seconds out of every minute or two. As long as switch 63 is in "Auto" position as shown, the percentage timer operates to provide a continuous inching energization to motor 69 to either raise or lower precipitator voltage depending upon the position of the contact-making meter pointer and the action of relays 56 or 57 as already described. It will be noted, however, that energization for relays 56 and 57 is provided only during the closure of switch 84a. For this purpose the D.-C. voltage source 55 is provided by a small alternating current transformer 82 with a conventional bridge type rectifier 86, which may be selenium for example, and bleeder resistor 87 connected as shown. The output may be typically 6 volts D.-C. between wires 59 and 60. The primary of transformer 82 is energized from source 74 via wires 76 and 85 on one side and via selector switch 63, control switch 84a and wire 83 on the other side. This system provides the holding contact circuit for positive relay closure, independent of vibration effects, during precipitator voltage adjustment as called for by the position of the contact-making meter contacts 53a, b, c. The percentage timer 84 thus serves the triple function of supplying adjustable inching energization to the variable auto transformer, energizing auxiliary relays 56, 57, and providing automatic holding contact interruption for these relays. The net result of this operating method is to maintain the precipitator voltage so that the average precipitator sparking rate is continuously and automatically maintained within the desired limits as set by the adjustable contacts 53a and 53b on switch 53'. This method of automatic precipitator voltage control is preferred with the continuous sparking rate measurement available with the electronic current integrator. This arrangement does not mitigate against using a periodic voltage adjustment if desired.

It may be noted that the integrator described responds exponentially to a change in sparking rate. Thus the system has the properties of a proportional rate controller in that the speed with which the device can act to correct the precipitator voltage increases as the difference between actual average sparking rate and the desired average sparking rate range increases.

Fig. 2 includes as a new element, automatic voltage control limit D.-C. relay consisting of a coil 80 and a pair of normally closed contacts 80a and 80b. Coil 80 is placed in series with the ground return of the high voltage rectifier; contact 80a is in series with the winding 67 of motor 69; contact 80b is in series with auxiliary relay 57. A bypass condenser 81 is placed across coil 80 to protect the latter from rectifier current surges. The percentage timer 84 may be of any conventional design, for example, an A.-C. driving motor 84b operating switch 84a so as to close the latter for an adjustable percentage of cycle time. The cycle time can conveniently be made about equal to the integrating time of the instrument as determined by the time-constant of resistors 48, 49, 50 and condenser 51. A cycle time between 1 and 5 minutes would be typical. By separating the two adjustable contacts 53a, 53b to opposite ends of meter 53 scale, meter 53 can conveniently be used as an instantaneous sparking rate indicator during manual adjustment of precipitator voltage—for example, in setting operating voltage initially to approximately the correct value or in conducting experimental tests wherein manual control is desired.

The automatic voltage control limit relay 80 is an important feature of the system in that it prevents the automatic voltage control circuits from increasing precipitator voltage beyond the point where rated rectifier current is drawn by the precipitator. At this current, which typically may be 230 ma. D.-C. for rectifier sets commonly used, the relay contacts 80a and 80b open. 80a opens the circuit to coil 67, thus stopping the motor 69 of variable auto transformer. Contact 80b de-energizes relay 57, thus stopping needless operation thereof. The limiting action is used in cases where little or no precipitator sparking occurs at maximum rectifier set current capacity. If at some later time the load conditions in the precipitator should change so that excessive sparking occurs, contacts 53a and 53c will close and the circuit will act forthwith to lower precipitator voltage. It will also be obvious that the limit relay action occurs on manual control as well as on automatic control.

It will be obvious to those skilled in the art that the use of the electronic current integrator for continuously recording the average sparking rate in an electrostatic precipitator is not limited to employment in conjunction with the contact-making meter automatic voltage control system described herein. The integrator is a basic component which can be used in a variety of ways to effect automatic control functions not only in the specific case of electrical precipitators, but also in other industrial processes. One particularly attractive automatic control system for general industrial use is, for example, the use of magnetic amplifiers or saturable reactors whose output or load circuit can be made responsive to the D.-C. current obtained from the electronic current integrator. Hence, a completely static and continuous automatic control system responsive to the deviation of the integrand from a pre-selected value or range of values can be made. The measurement of the average rate of occurrence of a series of events in terms of a D.-C. current of controllable range, such as is provided by the electronic integrator above described, is a method conveniently and economically suited to the control of saturable reactor or magnetic amplifier devices. The invention is therefore not intended to be limited to the present modifications shown herein, but its scope is defined by the appended claims.

I claim:

1. A device for energizing the electrodes of an electrical precipitator comprising a voltage regulator, a device responsive to disturbances in the system caused by an inter-electrode spark, a pulsing circuit for producing a pulse of substantially constant voltage for each incidence of said disturbance, an electronic integrating circuit for integrating said pulses to provide directly an electrical output the instantaneous value of which is a function of the pulse rate, and means responsive to the value of said output for controlling said voltage regulator.

2. A device for energizing the electrodes of an electrical precipitator comprising a voltage regulator, a pick-up device responsive to electrical conditions caused by an inter-electrode spark, a pulsing circuit controlled by said pick-up device for producing a pulse of substantially constant voltage upon each incidence of a spark, a capacitor-resistor integrating circuit for integrating said pulses, and control means responsive to the integrand of said pulses operatively associated with said voltage regulator for controlling the operating voltage of the precipitator.

3. A device for energizing the electrodes of an electrical precipitator comprising a voltage regulator, a pick-up device responsive to electrical conditions caused by an inter-electrode spark, a pulsing circuit controlled by said pick-up device for producing a pulse of substantially constant voltage upon each such incidence of a spark, an impedance network arranged as an integrating circuit, connections between said network and said pulsing circuit for feeding said pulses into said network to provide an integrated output therefrom, and control means responsive to said output for controlling said voltage regulator.

4. The invention as defined in claim 3 wherein said control means includes intermittent means for periodically sampling said output, and circuit elements operatively associated with said intermittent means for controlling the voltage regulator in accordance with said sampled value.

References Cited in the file of this patent

UNITED STATES PATENTS

| Number | Name | Date |
|---|---|---|
| 2,050,367 | Myhre | Aug. 11, 1936 |
| 2,297,740 | Brown | Oct. 6, 1942 |
| 2,297,841 | MacKenzie | Oct. 6, 1942 |
| 2,623,608 | Hall | Dec. 30, 1952 |